United States Patent
Harada

(10) Patent No.: US 11,172,095 B2
(45) Date of Patent: Nov. 9, 2021

(54) INFORMATION PROCESSING APPARATUS FOR GENERATING A SYNTHESIS IMAGE BY SYNTHESIZING AN EVIDENCE IMAGE WITH A REDUCTION IMAGE, METHOD AND NON-TRANSITORY COMPUTER READABLE MEDIUM STORING PROGRAM

(71) Applicant: FUJIFILM Business Innovation Corp., Tokyo (JP)

(72) Inventor: Masahide Harada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/858,693

(22) Filed: Apr. 26, 2020

(65) Prior Publication Data

US 2021/0120145 A1   Apr. 22, 2021

(30) Foreign Application Priority Data

Oct. 21, 2019   (JP) .............................. JP2019-192310

(51) Int. Cl.
*H04N 1/387* (2006.01)
*H04N 1/40* (2006.01)
*H04N 1/34* (2006.01)
*H04N 1/32* (2006.01)
(Continued)

(52) U.S. Cl.
CPC ....... *H04N 1/3871* (2013.01); *H04N 1/00442* (2013.01); *H04N 1/00461* (2013.01); *H04N 1/00482* (2013.01); *H04N 1/00485* (2013.01); *H04N 1/32133* (2013.01); *H04N 1/346* (2013.01); *H04N 1/393* (2013.01); *H04N 1/40012* (2013.01); *H04N 1/40093* (2013.01); *H04N 2201/325* (2013.01); *H04N 2201/3207* (2013.01); *H04N 2201/3214* (2013.01); *H04N 2201/3216* (2013.01);
(Continued)

(58) Field of Classification Search
CPC .. H04N 1/00405–0049; H04N 2201/32–3298; H04N 1/32101; H04N 1/32133; H04N 1/387; H04N 1/3871; H04N 1/393; H04N 1/40012; H04N 1/40093; H04N 1/00132–00201
See application file for complete search history.

(56) References Cited

U.S. PATENT DOCUMENTS 7,660,007 B2 * 2/2010 Uchida ............... H04N 1/00143
358/1.15
7,812,859 B2 * 10/2010 Ito ......................... G06F 3/1211
348/207.1
(Continued)

FOREIGN PATENT DOCUMENTS

| JP | 2001206660 | 7/2001 |
| JP | 2003022479 | 1/2003 |
| JP | 2013218545 | 10/2013 |

*Primary Examiner* — Scott A Rogers
(74) *Attorney, Agent, or Firm* — JCIPRNET

(57) ABSTRACT

An information processing apparatus includes an acquisition unit that acquires a processed image obtained through image processing, and a generation unit that generates a synthesis image obtained by synthesizing an evidence image, which is an image becoming an evidence of the image processing and including at least information on a fee required for the image processing, with a reduction image obtained by reducing the processed image.

13 Claims, 8 Drawing Sheets

(51) Int. Cl.
*H04N 1/393* (2006.01)
*H04N 1/00* (2006.01)

(52) U.S. Cl.
CPC ............... *H04N 2201/3218* (2013.01); *H04N 2201/3222* (2013.01); *H04N 2201/3243* (2013.01)

(56) References Cited

U.S. PATENT DOCUMENTS

| | | | | |
|---|---|---|---|---|
| 2001/0003190 A1* | 6/2001 | Shindo | ............... | H04N 1/00148 709/217 |
| 2015/0172479 A1* | 6/2015 | Sano | ................. | H04N 1/00474 705/39 |
| 2019/0149671 A1* | 5/2019 | Ikeda | ................. | H04N 1/00172 358/1.13 |

* cited by examiner

INFORMATION PROCESSING APPARATUS FOR GENERATING A SYNTHESIS IMAGE BY SYNTHESIZING AN EVIDENCE IMAGE WITH A REDUCTION IMAGE, METHOD AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-192310 filed Oct. 21, 2019.

BACKGROUND

(i) Technical Field

The present invention relates to an information processing apparatus and a non-transitory computer readable medium storing a program.

(ii) Related Art

A printing device is known which includes a secret key generation unit that generates a secret key corresponding to the printing device, a public key generation unit that generates a public key corresponding to the secret key, a secret key storage unit that stores the secret key, and a transmission unit that transmits the public key, the printing device generating encoded settlement information by encoding settlement information based on the secret key, and printing the settlement information and the encoded settlement information on a receipt (for example, see JP2013-218545A).

A sales management device is also known which includes an input unit that inputs product data of a sold product and price data of the product for each transaction, a transaction specification data storage unit that stores transaction specification data including the product data and the price data by attaching a transaction number for each transaction, and an output unit that includes a display section for searching for and displaying the transaction specification data, a receipt issuing section for issuing a receipt by referring to the transaction specification data for every transaction, and an acceptance receipt issuing section for issuing an acceptance receipt based on the transaction statement data, the sales management device issuing the acceptance receipt relevant to a specific transaction specification data selected from among the transaction specification data displayed on the display section (for example, see JP2003-022479A).

SUMMARY

In a case where an evidence image, which is an image becoming an evidence of image processing and including at least information on a fee required for the image processing, includes only a data name of data which becomes an image processing target, it is not possible to entirely recognize content of the data which becomes the image processing target from the evidence image.

Aspects of non-limiting embodiments of the present disclosure relate to an information processing apparatus and a non-transitory computer readable medium storing a program that make content of the data which becomes the image processing target be recognized easily, compared to the case where the evidence image, which is the image becoming the evidence of the image processing and which is the image including at least the information on the fee required for the image processing, includes the data name of the data which becomes the image processing target.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including an acquisition unit that acquires a processed image obtained through image processing, and a generation unit that generates a synthesis image obtained by synthesizing an evidence image, which is an image becoming an evidence of the image processing and including at least information on a fee required for the image processing, with a reduction image obtained by reducing the processed image.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the accompanying drawings.

Hardware Configuration of Image Processing Apparatus

Figure 1:
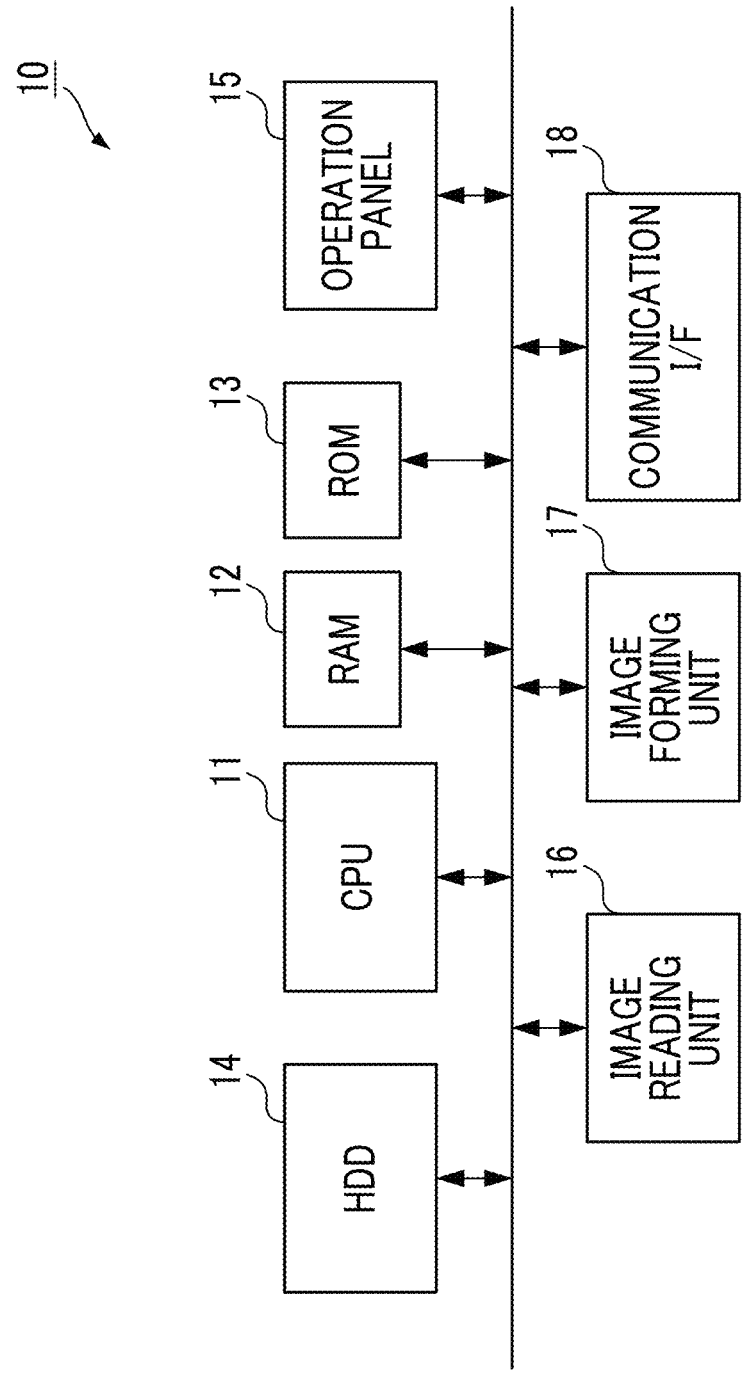
FIG. 1 is a diagram illustrating a hardware configuration example of an image processing apparatus according to an exemplary embodiment of the present invention.

FIG. 1 is a diagram illustrating a hardware configuration example of an image processing apparatus 10 according to the exemplary embodiment. As illustrated in the drawing, the image processing apparatus 10 includes a Central Processing Unit (CPU) 11, a Random Access Memory (RAM) 12, a Read Only Memory (ROM) 13, a Hard Disk Drive (HDD) 14, an operation panel 15, an image reading unit 16, an image forming unit 17, and a communication interface (hereinafter, referred to as "communication I/F") 18.

The CPU 11 realizes various functions which will be described later by loading and executing various programs stored in the ROM 13 or the like into the RAM 12.

The RAM 12 is a memory used as a work memory or the like of the CPU 11. The ROM 13 is a memory that stores the various programs and the like which are executed by the CPU 11. The HDD 14 is, for example, a magnetic disk device that stores image data read by the image reading unit 16, image data used for image formation in the image forming unit 17, and the like.

The operation panel 15 is, for example, a touch panel that displays various pieces of information and receives operation input from a user. Here, the operation panel 15 includes a display, on which the various pieces of information are displayed, and a location detection sheet for detecting a location, an instruction for which is provided by an instruction unit such as a finger or a stylus pen. Otherwise, a display and a keyboard may be used instead of the touch panel.

The image reading unit 16 reads an image recorded on a recording medium such as paper. Here, the image reading unit 16 is, for example, a scanner, and may use a CCD method for reducing reflected light with respect to light emitted from a light source to a document using a lens and receiving the light by a Charge Coupled Device (CCD), or a Contact Image Sensor (CIS) method for receiving the reflected light with respect to the light sequentially emitted from an LED light source to the document using a CIS sensor.

The image forming unit 17 forms an image on the recording medium such as paper. Here, the image forming unit 17 is, for example, a printer, and may use an electrographic method for forming an image by transferring toner adhered to a photoreceptor to a recording medium, or an inkjet method for forming the image by discharging ink onto the recording medium.

The communication I/F 18 transmits and receives the various pieces of information to and from another device through a communication line.

Outline of Exemplary Embodiment

In the exemplary embodiment, the image processing apparatus 10 generates a synthesis image obtained by synthesizing an evidence image, which is an image becoming an evidence of image processing and including at least information on a fee required for the image processing, with a reduction image obtained by reducing the processed image obtained through the image processing.

Hereinafter, as the evidence image, a receipt image, which is a basis of a receipt, will be described as an example. The receipt in the exemplary embodiment is, for example, a letter certifying that a store or the like, in which the image processing apparatus 10 is installed, receives the fee required for the image processing from a customer who performs the image processing using the image processing apparatus 10. The receipt may include a thing which generally referred to as a recipience letter, a receipt, or the like.

In addition, the reduction image is an image that allows a person to view and recognize content of the processed image, and does not include a barcode, a QR code (registered trademark), and the like. Hereinafter, a thumbnail image will be described as an example of the reduction image.

By the way, in a case where a synthesis image obtained by synthesizing a receipt image with the thumbnail image is generated as described above and the amount of thumbnail image is too large, it is not possible to print all the thumbnail images in a space of one sheet of receipt.

Here, in the exemplary embodiment, in a case where the amount of thumbnail image exceeds a first image amount which is an amount of an image that is synthesizable with the receipt image, an operation of reducing the amount of thumbnail image to be equal to or less than the first image amount is performed. In addition, in a case where the amount of thumbnail image exceeds the first image amount, an operation of generating a plurality of synthesis images is performed, each of the synthesis images being an image obtained by synthesizing the receipt image with a part of the first image amount of the thumbnail image. Hereinafter, the former will be described as a first operational example and the latter will be described as a second operational example in detail. Also, here, although the description is made while focusing on the amount of thumbnail image, the thumbnail image corresponding to one page is generally generated from the processed image corresponding to one page, and thus, hereinafter, description will be made while focusing on a page of the thumbnail image.

Functional Configuration of Image Processing Apparatus

Figure 2:
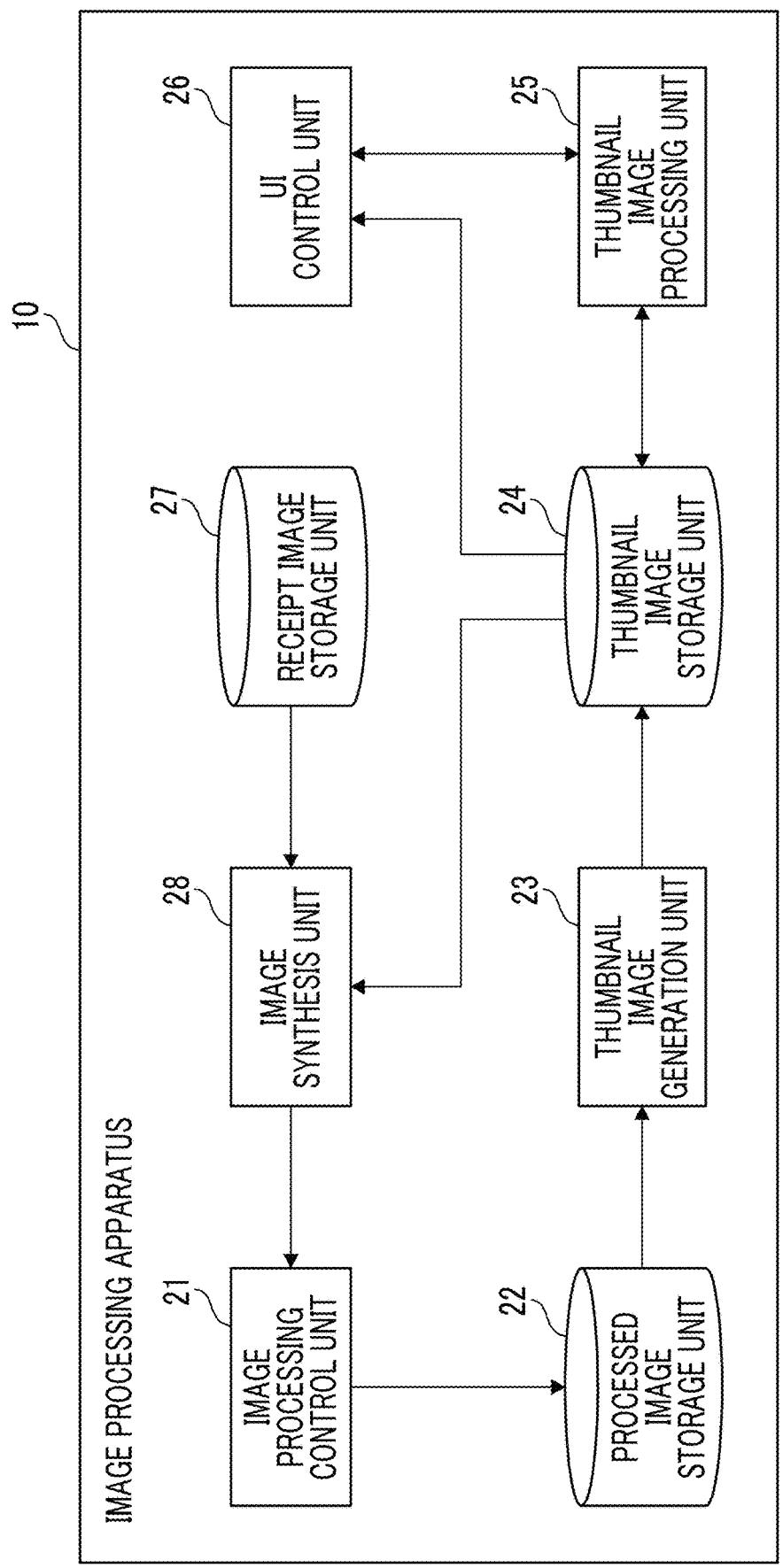
FIG. 2 is a block diagram illustrating a functional configuration example of the image processing apparatus according to the exemplary embodiment of the present invention.

FIG. 2 is a block diagram illustrating a functional configuration example of the image processing apparatus 10 according to the exemplary embodiment. The image processing apparatus 10 according to the exemplary embodiment is an example of an information processing apparatus, and includes an image processing control unit 21, a processed image storage unit 22, a thumbnail image generation unit 23, a thumbnail image storage unit 24, a thumbnail image processing unit 25, a UI control unit 26, a receipt image storage unit 27, and an image synthesis unit 28, as illustrated in the drawing.

The image processing control unit 21 controls execution of the image processing including reading of an image by the image reading unit 16 (see FIG. 1), formation of an image by the image forming unit 17 (see FIG. 1). Further, the image processing control unit 21 acquires the processed image such as the image read by the image reading unit 16 or the image formed by the image forming unit 17. In the exemplary embodiment, the image processing control unit 21 is provided as an example of an acquisition unit that acquires the processed image obtained through the image processing. In addition, specifically, in a case where a synthesis image of the receipt image and the thumbnail image is acquired from the image synthesis unit 28 as will be described later, formation of the synthesis image in the image forming unit 17 is controlled.

The processed image storage unit 22 stores the processed image acquired by the image processing control unit 21. Here, the processed image storage unit 22 may have a capacity required to temporarily store the processed image for each image processing instruction.

The thumbnail image generation unit 23 generates the thumbnail image from the processed image stored in the processed image storage unit 22.

The thumbnail image storage unit 24 stores the thumbnail images generated by the thumbnail image generation unit 23.

The thumbnail image processing unit 25 processes the thumbnail image stored in the thumbnail image storage unit 24. Specifically, at least any one of a thumbnail image editing process or a thumbnail image selecting process is performed.

First, the thumbnail image processing unit 25 performs a process of deleting a deletion target part of the thumbnail image for an editing target range of the thumbnail image, as the thumbnail image editing process.

Here, the editing target range may be a range designated in page units. The range designated in page units may be, for example, all pages or some pages. In the latter case, the user may designate some of the pages. Otherwise, the editing target range may be a range designated regardless of the page. The range designated regardless of the page may be, for example, a range in the page. In this case, the range may be designated by the user performing a drag operation or inputting coordinates on the thumbnail image displayed on the operation panel 15 (see FIG. 1).

In addition, the deletion target part may be a characteristic part designated by the user. The characteristic part may be, for example, a text part or an image part. In this case, the thumbnail image processing unit 25 has a function of recognizing the parts. Otherwise, the characteristic part may be, for example, a text part including personal information such as a name and an address. In this case, the thumbnail image processing unit 25 has a function of recognizing the text part including the personal information through learning. Otherwise, the characteristic part may be, for example, a part of an image of a person. In this case, the thumbnail image processing unit 25 has a function of recognizing the part of the image of the person through the learning. In addition, the deletion target part may not be directly designated by the user and may be determined by the thumbnail image processing unit 25 based on a document format. For example, for an area, which is known that text including the personal information exists in the document format, the area is set as the deletion target part. Also, in the specification, the "text" refers to a code formed using a line or a point, and includes a symbol.

Furthermore, the deletion process may be a concealment process of filling the deletion target part with white or black or blurring the deletion target part. In this case, an area where the deletion target part exists remains on the thumbnail image, and thus the number of pages of the thumbnail images does not decrease. Otherwise, the deletion process may be an area deletion process of deleting the area where the deletion target part exists. In this case, a deleted area is filled in such a way that text or an image subsequent to the area is moved forward, and thus there is a possibility that the number of pages of the thumbnail images is reduced. Also, in a case where the area deletion process is performed as the deletion process, the area deletion process is an example of selecting a part that satisfies a previously fixed condition regarding an image feature from the reduction image.

Also, the thumbnail image processing unit 25 may perform a process of reducing the thumbnail image according to a size of the receipt as the thumbnail image editing process. For example, the thumbnail image may be reduced by cutting out a part of the page (a title, a peripheral part thereof, or the like).

In addition, the thumbnail image processing unit 25 performs the following process as the thumbnail image selection process.

In the first operational example, in a case where the number of pages of the thumbnail images exceeds a first threshold which is the number of pages that is synthesizable with the receipt image, the thumbnail image processing unit 25 performs a process of reducing the number of pages of the thumbnail images to be equal to or less than the first threshold. Specifically, in a case where the number of pages of the thumbnail images is small, that is, in a case where the number of pages that is synthesizable with the receipt image is equal to or less than the first threshold, all the pages of the thumbnail images become targets to be synthesized with the receipt image. On the other hand, in a case where the number of pages of the thumbnail images is large, that is, in a case where the number of pages of the thumbnail images is larger than the first threshold, some pages of all the pages of the thumbnail images are selected to be the targets to be synthesized with the receipt image. In the exemplary embodiment, the first threshold is used as an example of the first image amount which is the amount of image that is synthesizable with the evidence image, and the thumbnail image processing unit 25 is provided as an example of a processing unit that performs the process of reducing the reduction image amount to be equal to or less than the first image amount.

In the second operational example, in a case where the number of pages of the thumbnail images exceeds a second threshold which is the number of pages that is synthesizable with a plurality of receipt images, the thumbnail image processing unit 25 performs a process of reducing the number of pages of the thumbnail images to be equal to or less than the second threshold. Specifically, in a case where the number of pages of the thumbnail images is equal to or less than the second threshold which is the number of pages that is synthesizable with N (N is an integer which is equal to or larger than 2) receipt images, all the pages of the thumbnail images are set to targets to be synthesized with the N receipt images. On the other hand, in a case where the number of pages of the thumbnail images is larger than the second threshold, some pages are selected from all the pages of the thumbnail images and the selected pages are set as the targets to be synthesized with the N receipt images. Here, the second threshold may be a value obtained by multiplying the first threshold by N. In the exemplary embodiment, the second threshold is used as an example of a second image amount which is the amount of image that is synthesizable with the evidence image in a plurality of synthesis images.

Here, as a method for selecting some pages from all the pages of the thumbnail images, there is a method for selecting a predetermined page from all the pages of the thumbnail images. For example, there is a method for selecting the page of the thumbnail image for every ten pages. The method is an example of a method for selecting a part of a predetermined location from the reduction image. In addition, as the method for selecting some pages from all the pages of the thumbnail images, there is a method for selecting a randomly determined page from all the pages of the thumbnail images. For example, a method is provided for selecting the page of the thumbnail image according to a random number generated by a random number generator. The method is an example of a method for selecting a part of a randomly determined location from the reduction image. Further, as the method for selecting some pages from all pages of the thumbnail images, there is a method for selecting a characteristic page from all the pages of the thumbnail images. For example, there is a method for selecting a page containing an element other than text or a method for selecting a page containing the element other than the text at a ratio which is equal to or more than a previously fixed ratio. The method is an example of a method for selecting the part that satisfies the previously fixed condition regarding the image feature from the reduction image.

Also, in a case where it is known from the beginning that the number of pages of the thumbnail images is the number of pages that is synthesizable with the receipt image, a process of the thumbnail image processing unit 25 may be terminated by the user pressing an end button. That is, in a case where a user operation of pressing the end button is detected, the thumbnail image processing unit 25 may instruct the image synthesis unit 28 to synthesize the receipt image with the thumbnail image.

The UI control unit 26 performs control such that the thumbnail image stored in the thumbnail image storage unit 24 or the thumbnail image being edited by the thumbnail image processing unit 25 are displayed on the operation panel 15. In addition, the UI control unit 26 controls detection of the user operation on an option or the thumbnail image displayed on the operation panel 15.

The receipt image storage unit 27 stores the receipt image. Here, the receipt image is generated based on the fee, which is required for the image processing including the reading of the image by the image reading unit 16 (see FIG. 1) and the formation of the image by the image forming unit (see FIG. 1), the number of sheets on which the image processing is performed, and the like. Here, the fee required for the image processing may be calculated by a not-shown settlement function included in the image processing apparatus 10. In addition, the receipt image may include information, such as a device installation location or a processing date and time, for further improving reliability of the receipt image.

The image synthesis unit 28 generates the synthesis image by synthesizing the receipt image, which is stored in the receipt image storage unit 27, with the thumbnail image which is stored in the thumbnail image storage unit 24 and on which at least one of a thumbnail image selecting process or the thumbnail image editing process is performed by the thumbnail image processing unit 25. Specifically, the image synthesis unit 28 performs the following process.

In the first operational example, the thumbnail image processing unit 25 performs the process of reducing the number of pages of the thumbnail images to be equal to or less than the first threshold, and thus the image synthesis unit 28 synthesizes all the pages of the thumbnail images with one receipt image.

In the second operational example, in a case where the number of pages of the thumbnail images exceeds the first threshold which is the number of pages that is synthesizable with the receipt image, the image synthesis unit 28 generates a plurality of synthesis images, each of which is an image acquired by synthesizing the evidence image with a part of the first image amount of the reduction image. Specifically, in a case where the number of pages of the thumbnail images is small, that is, in a case where the number of pages that is synthesizable with the receipt image is equal to or less than the first threshold, all the pages of the thumbnail image are synthesized with one receipt image. On the other hand, in a case where the number of pages of the thumbnail images is large, that is, in a case where the number of pages is larger than the first threshold, the pages of the thumbnail images that is synthesizable are synthesized with one receipt image, and all the pages of the thumbnail images, which are reduced to be equal to or less than the second threshold by the thumbnail image processing unit 25, are synthesized with the N receipt images.

In the exemplary embodiment, the image synthesis unit 28 is provided as an example of a generation unit that generates the synthesis image acquired by synthesizing the evidence image with the reduction image.

Further, the image synthesis unit 28 outputs the synthesis image to the image processing control unit 21.

Operation of Image Processing Apparatus

First Operational Example

Figure 3:
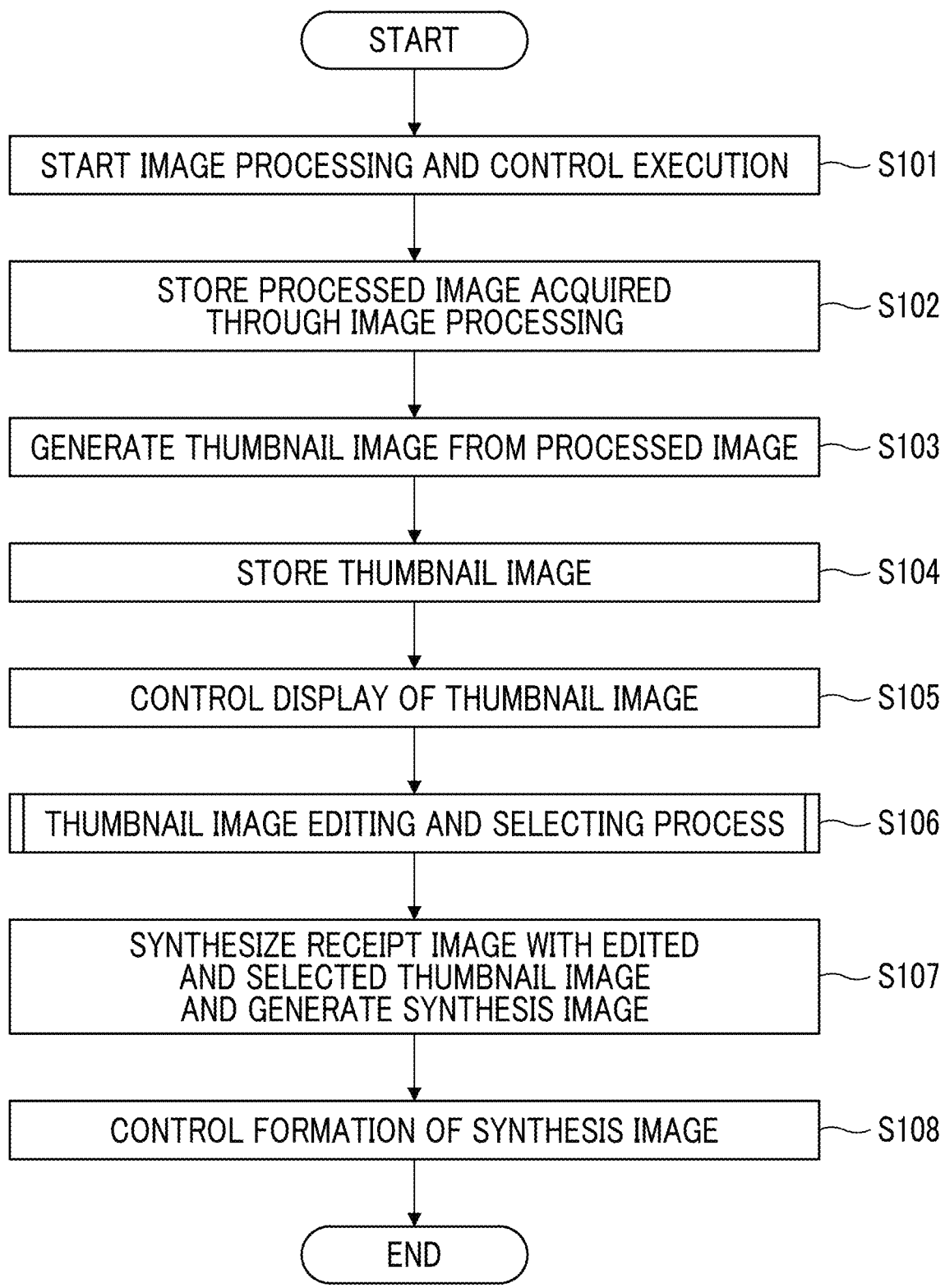
FIG. 3 is a flowchart illustrating a first operational example of the image processing apparatus according to the exemplary embodiment of the present invention.

FIG. 3 is a flowchart illustrating the first operational example of the image processing apparatus 10 according to the exemplary embodiment.

As shown in the drawing, in the image processing apparatus 10, first, the image processing control unit 21 controls execution of the image processing such as the reading of the image in the image reading unit 16 (see FIG. 1), the formation of the image in the image forming unit 17 (see FIG. 1), and the like (step S101). Further, the processed image as a result of the image processing is stored in the processed image storage unit 22 (step S102).

Subsequently, the thumbnail image generation unit 23 generates the thumbnail image from the processed image stored in the processed image storage unit 22 in step S102 (step S103). Further, the thumbnail image is stored in the thumbnail image storage unit 24 (step S104).

Subsequently, the UI control unit 26 performs control such that the thumbnail image stored in the thumbnail image storage unit 24 in step S104 is displayed on the operation panel 15 (step S105).

Subsequently, the thumbnail image processing unit 25 performs a thumbnail image editing and selecting process (step S106). Here, the thumbnail image editing and selecting process is a process of editing and selecting the thumbnail image stored in the thumbnail image storage unit 24 in step S104 according to the user operation with respect to the thumbnail image displayed on the operation panel 15 in step S105. The thumbnail image editing and selecting process will be described in detail later. The thumbnail image edited and selected through the thumbnail image editing and selecting process is rewritten in the thumbnail image storage unit 24.

Thereafter, the image synthesis unit 28 generates the synthesis image by synthesizing the receipt image stored in the receipt image storage unit 27 with the edited and selected thumbnail image stored in the thumbnail image storage unit 24 in step S106 (step S107).

Finally, the image processing control unit 21 controls the formation of the synthesis image generated in step S107 by the image forming unit 17 (step S108).

Subsequently, the thumbnail image editing and selecting process in step S106 of FIG. 3 will be described in detail.

Figure 4:
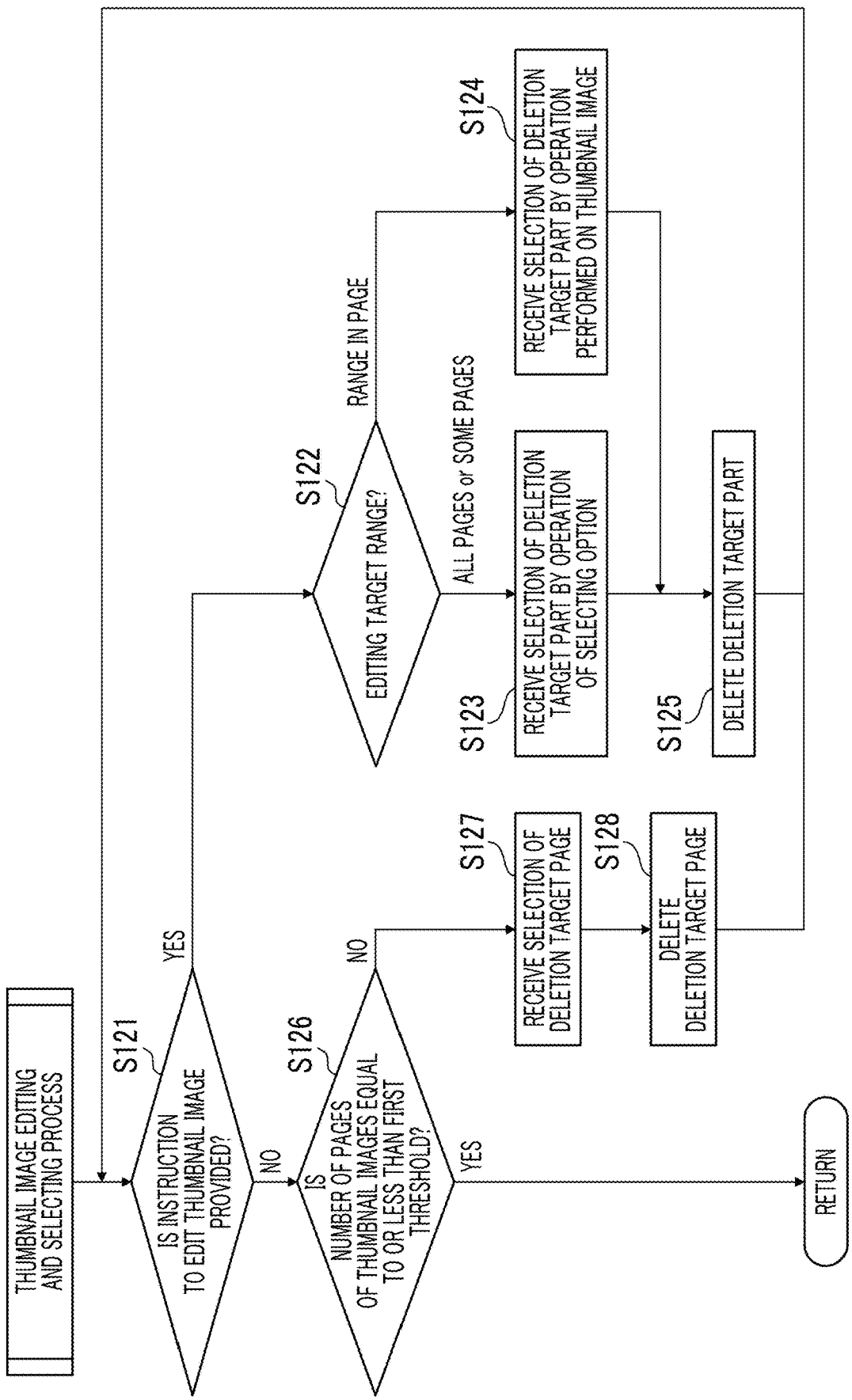
FIG. 4 is a flowchart illustrating a processing example of a thumbnail image editing and selecting process in the first operational example of the image processing apparatus according to the exemplary embodiment of the present invention.

FIG. 4 is a flowchart illustrating a processing example of the thumbnail image editing and selecting process in the first operational example of the image processing apparatus 10 of the exemplary embodiment.

As illustrated in the drawing, the thumbnail image processing unit 25 first determines whether or not an instruction to edit the thumbnail image is provided (step S121). Specifically, the UI control unit 26 receives the user operation having a gist for editing the thumbnail image on the operation panel 15, and determines whether or not the thumbnail image processing unit 25 receives the gist from the UI control unit 26.

Here, a case where the thumbnail image processing unit 25 determines that the instruction to edit the thumbnail image is provided will be described.

In this case, the thumbnail image processing unit 25 first determines the editing target range of the thumbnail image (step S122). Specifically, the UI control unit 26 receives the user operation of designating any of the editing target range of the thumbnail image on the operation panel 15, and determines whether or not the thumbnail image processing unit 25 receives information on any of the editing target range from the UI control unit 26. Here, the editing target range of the thumbnail image includes all the pages, some pages designated by the user, a range designated by the user in the page designated by the user, and the like.

As a result, in a case where it is determined that the editing target range of the thumbnail image is all the pages or some pages, the thumbnail image processing unit 25 receives selection of the deletion target part through an operation of selecting the option (step S123). More specifically, the UI control unit 26 receives the user operation of selecting one option from a plurality of options displayed on the operation panel 15, and receives information on the option selected by the thumbnail image processing unit 25. Here, the plurality of options include "delete text section", "delete image section", "delete personal information text section", "delete person image section", "delete document format", and the like.

On the other hand, in a case where it is determined that the editing target range of the thumbnail image is the range in the page, the thumbnail image processing unit 25 receives the selection of the deletion target part through the operation performed on the thumbnail image (step S124). Specifically, the UI control unit 26 receives the user operation of designating the range through dragging or coordinate inputting on the thumbnail image displayed on the operation panel 15, and the thumbnail image processing unit 25 receives information on the designated range. Here, the range designated through the dragging or the coordinate inputting includes, for example, a range in which a part, such as personal information, that is not needed to be printed on the receipt is described.

Subsequently, the thumbnail image processing unit 25 deletes the deletion target part, the selection of which is received in step S123 or S124 (step S125). Here, the deletion of the deletion target part may be performed through the concealment process of filling the deletion target part with black or white or blurring the deletion target part. Otherwise, the deletion of the deletion target part may be the area deletion process of deleting an area where the deletion target part exists, and filling the area with subsequent texts, images, and the like.

Thereafter, the thumbnail image processing unit 25 returns the process to step S121.

In addition, a case where the thumbnail image processing unit 25 does not determine that the instruction to edit the thumbnail image is provided will be described.

In this case, the thumbnail image processing unit 25 first determines whether the number of pages of the thumbnail images is equal to or less than the first threshold (step S126).

As a result, in a case where it is not determined that the number of pages of the thumbnail images is equal to or less than the first threshold, the thumbnail image processing unit 25 receives the selection of a deletion target page (step S127). Specifically, the UI control unit 26 receives the user operation of selecting the deletion target page or a printing target page on the thumbnail image displayed on the operation panel 15. Further, the thumbnail image processing unit 25 receives information on the deletion target page or the printing target page. In a case where the information on the deletion target page is received, the thumbnail image processing unit 25 sets the page as the deletion target page, and, in a case where the information on the printing target page is received, the thumbnail image processing unit 25 sets a page other than the page as the deletion target page. Otherwise, the UI control unit 26 receives the user operation of designating a method for selecting the deletion target page on the operation panel 15, and the thumbnail image processing unit 25 searches the pages of the thumbnail images for the page using a designated method, and sets the found page as the deletion target page. Here, the method for selecting the deletion target page includes a method for selecting a predetermined page, a method for selecting a randomly determined page, and a method for selecting a characteristic page.

Subsequently, the thumbnail image processing unit 25 deletes the deletion target page, the selection of which is received in step S127 (step S128).

Thereafter, the thumbnail image processing unit 25 returns the process to step S121.

On the other hand, in a case where it is determined that the number of pages of the thumbnail images is equal to or less than the first threshold, the thumbnail image processing unit 25 returns the process to the flowchart of FIG. 3.

Also, in the above operational example, although thumbnail image reduction ratio is not mentioned, the thumbnail image processing unit 25 may adjust the reduction ratio in a case where the thumbnail image is generated.

For example, the thumbnail image processing unit 25 may increase the number of sheets of reduction images by increasing the reduction ratio in a case of a document having a large font size. This is an example in which the reduction image is generated by increasing the reduction ratio in a case of a document whose font size is the first size rather than a case of a document whose font size is a second size that is less than the first size.

Otherwise, the thumbnail image processing unit 25 may increase the number of sheets of reduction images by increasing the reduction ratio in a case of a document including only images. In a broader sense, it can be mentioned that, in the case of a document which does not include text in the image, the number of sheets of reduction images may be increased by increasing the reduction ratio. This is an example of generating the reduction image by increasing the reduction ratio rather than a case of a document which includes the text in the image in a case of the document which does not include the text in the image.

In addition, in the above operational example, although the case where a plurality of files are output is not mentioned, in this case, the image synthesis unit 28 also may synthesize the receipt image with the plurality of thumbnail images obtained from the plurality of files.

For example, in a case where the plurality of files are output and the number of pages acquired by adding the plurality of files is equal to or less than the first threshold which is the number of pages that is synthesizable with the receipt image, the image synthesis unit 28 may synthesize the receipt image with the plurality of thumbnail images obtained from the plurality of files as it is.

Otherwise, in a case where the plurality of files are output and the total number of pages acquired by adding the plurality of files exceeds the first threshold which is the number of pages that is synthesizable with the receipt image, the image synthesis unit 28 may synthesize the receipt image with the thumbnail images obtained from respective characteristic pages of the plurality of files. Also, although the respective characteristic pages of the plurality of files are selected by the thumbnail image processing unit 25, the method already described above may be used as a treatment performed in a case where a page to be deleted by the thumbnail image processing unit 25 exists or a method for selecting the characteristic page.

Output Example in First Operational Example

Figure 5:
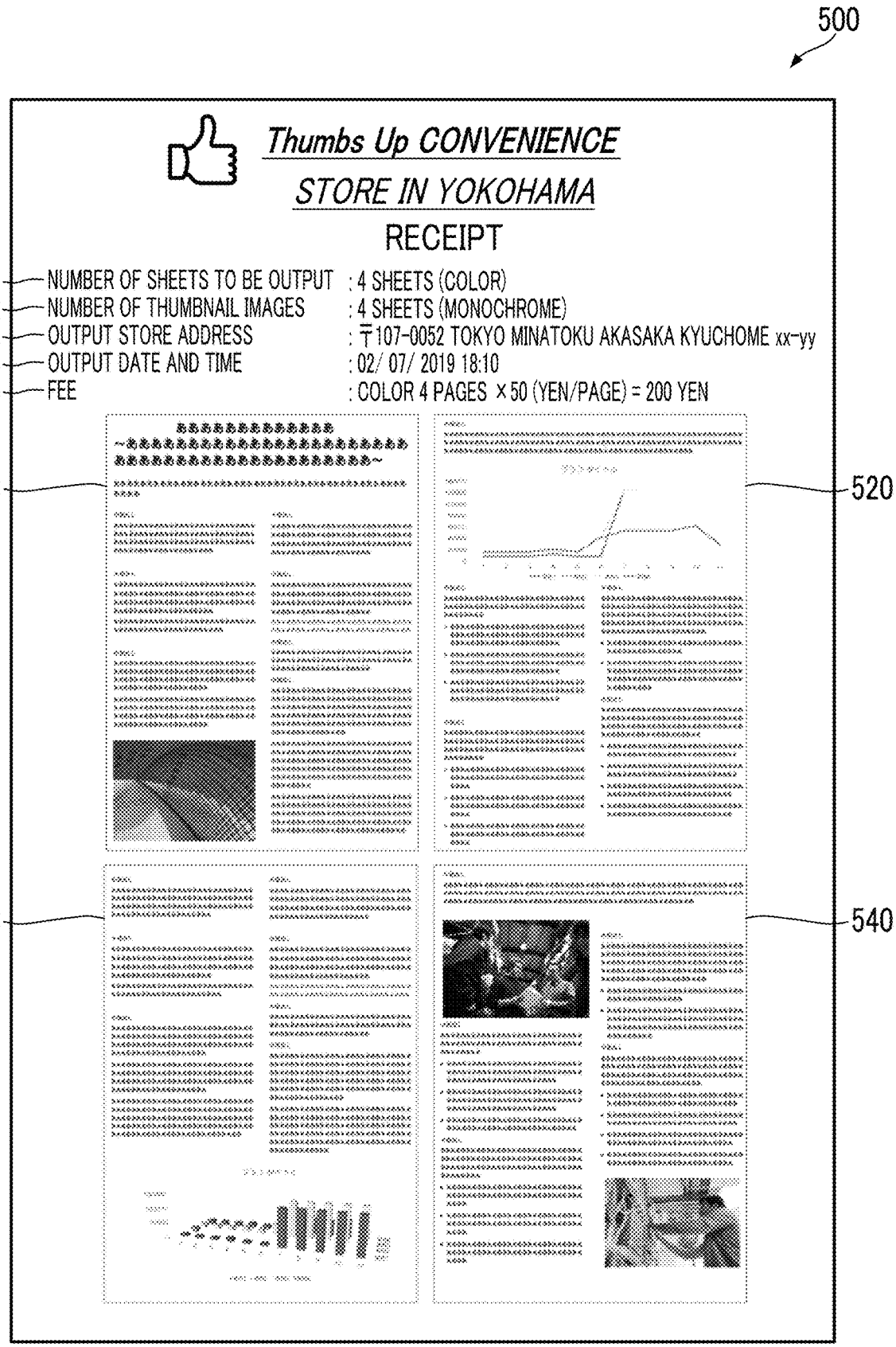
FIG. 5 is a diagram illustrating an example of a receipt output in the first operational example of the image processing apparatus according to the exemplary embodiment of the present invention.

FIG. 5 is a diagram illustrating an example of the receipt output in the first operational example of the image processing apparatus 10 according to the exemplary embodiment. That is, the receipt is a result of output in which the formation of the synthesis image by the image forming unit 17 (see FIG. 1) in step S108 of FIG. 3 is controlled.

As illustrated in the drawing, a receipt 500 includes an output sheet number description 501, a thumbnail image number description 502, an output store address description 503, an output date and time description 504, and a fee description 505.

The output sheet number description 501 is a description indicating the number of sheets of output documents which are targets whose fee is certified on the receipt 500, and the thumbnail image number description 502 is a description indicating the number of thumbnail images of the output documents included in the receipt 500. The example indicates that the number of sheets of output documents is four and the receipt 500 includes all the thumbnail images of the output documents. In addition, the output sheet number description 501 and the thumbnail image number description 502 respectively include, as an example of the processing condition of the image processing, information indicating whether an image of the output document and the thumbnail image are formed in color or in black and white. The example illustrates that the image of the output document is formed in color but the thumbnail image of the receipt 500 is formed after being converted to black and white.

The output store address description 503 is a description indicating an address of a store where the output document is output, and the output date and time description 504 is a description indicating a date and time at which the output document is output.

The fee description 505 is a description indicating a fee required for outputting the output document. Here, the image of the output document is formed in color by four sheets, and it is assumed that 50 yen is required to form the image in color per sheet, and thus the fee becomes 200 yen.

In addition, as illustrated in the drawing, the receipt 500 further includes a first page thumbnail image 510 of the output document, a second page thumbnail image 520 of the output document, a third page thumbnail image 530 of the output document, and a fourth page thumbnail image 540 of the output document. That is, since the receipt 500 includes four thumbnail images 510 to 540, an example in which the first threshold is 4 is provided.

Figure 6:
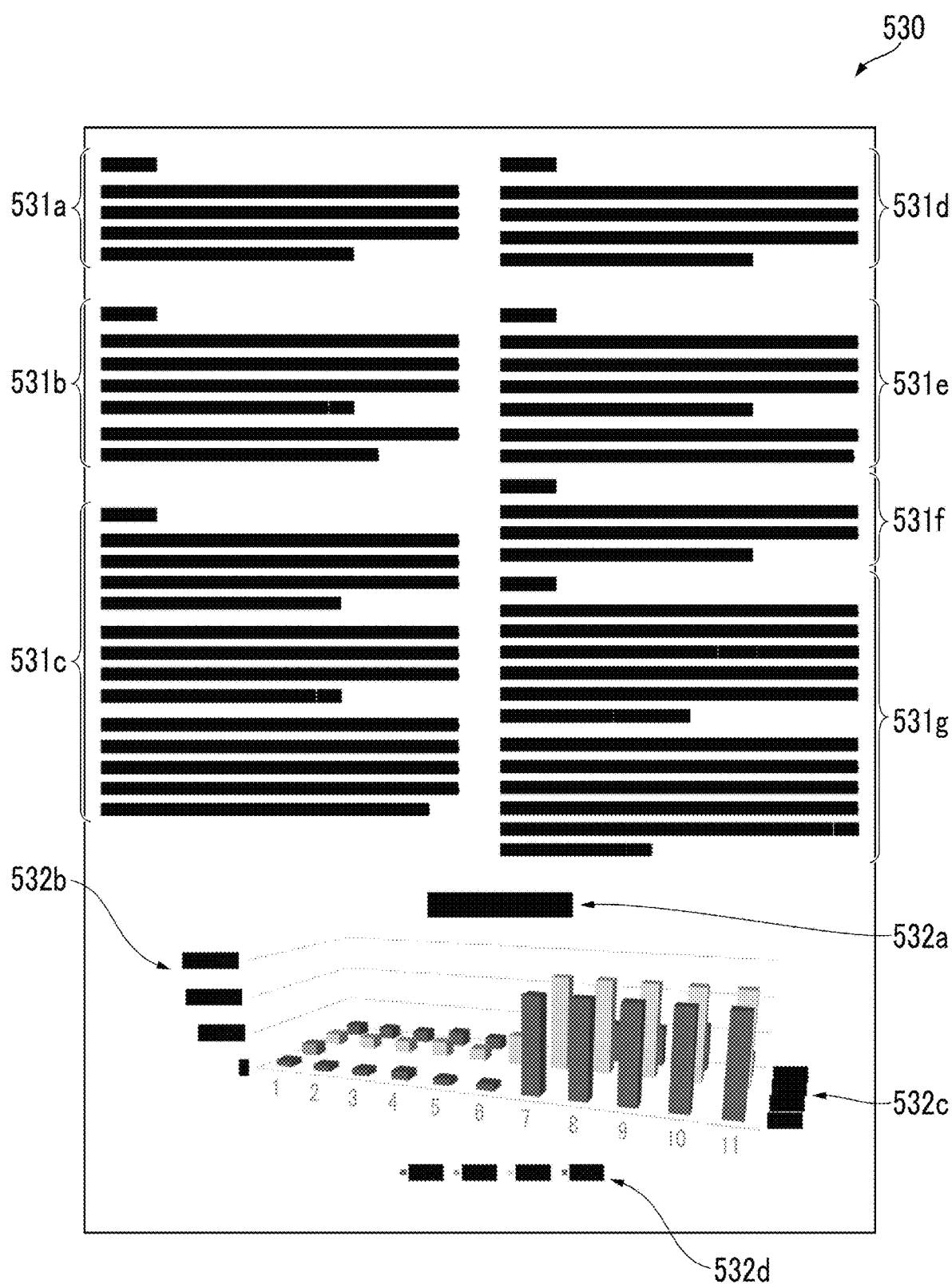
FIG. 6 is an enlarged diagram illustrating a thumbnail image included in the receipt output in the first operational example of the image processing apparatus according to the exemplary embodiment of the present invention.

FIG. 6 is an enlarged view of the thumbnail image 530 included in the receipt 500 which is output in the first operational example of the image processing apparatus 10 of the exemplary embodiment. The thumbnail image 530 is not filled or blurred in FIG. 5. However, in FIG. 6, the text section of the thumbnail image 530 is filled with black based on a fact that "delete text part" is selected in step S123 of FIG. 4. Specifically, text sections 531*a* to 531*g* in sentences and text sections 532*a* to 532*d* in a graph are filled with black.

Second Operational Example

Figure 7:
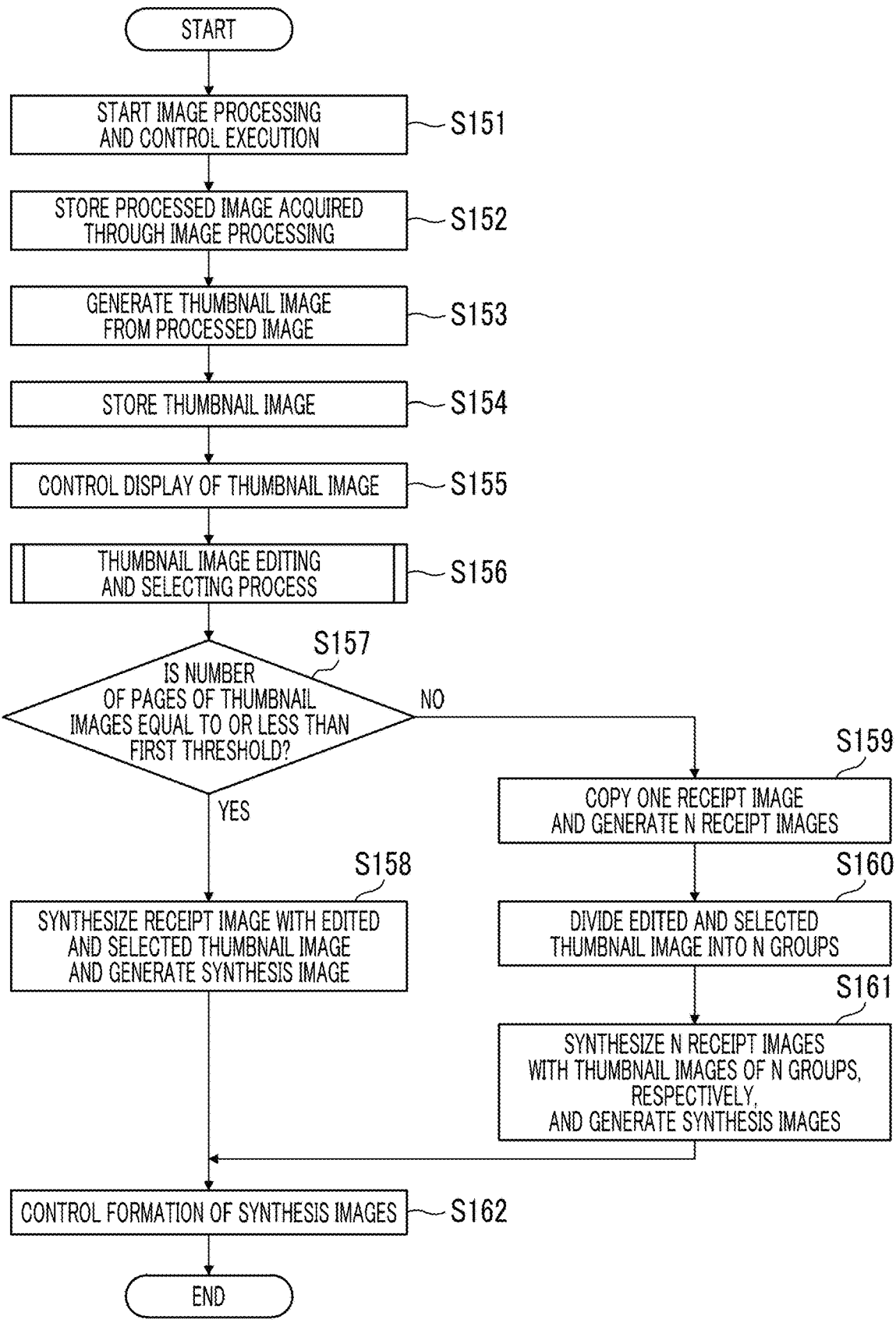
FIG. 7 is a flowchart illustrating a second operational example of the image processing apparatus according to the exemplary embodiment of the present invention.

FIG. 7 is a flowchart illustrating a second operational example of the image processing apparatus 10 of the exemplary embodiment.

As illustrated in the drawing, the image processing apparatus 10 first performs the same process as in steps S101 to S105 in FIG. 3 (steps S151 to S155).

Subsequently, in the image processing apparatus 10, the thumbnail image processing unit 25 performs the thumbnail image editing and selecting process (step S156). Here, the thumbnail image editing and selecting process is a process of editing and selecting the thumbnail image stored in the thumbnail image storage unit 24 in step S154 according to the user operation with respect to the thumbnail image displayed on the operation panel 15 in step S155. The thumbnail image editing and selecting process will be described in detail later. The thumbnail image edited and selected through the thumbnail image editing and selecting process is rewritten in the thumbnail image storage unit 24.

Thereafter, the image synthesis unit 28 determines whether or not the number of pages of the edited and selected thumbnail images stored in the thumbnail image storage unit 24 in step S156 is equal to or less than the first threshold (step S157).

As a result, in a case where it is determined that the number of pages of the edited and selected thumbnail images is equal to or less than the first threshold, the image synthesis unit 28 generates the synthesis image by synthesizing the receipt image stored in the receipt image storage unit 27 with the edited and selected thumbnail images (step S158).

On the other hand, in a case where it is not determined that the number of pages of the edited and selected thumbnail images is equal to or less than the first threshold, the image synthesis unit 28 generates N receipt images by copying the receipt image stored in the receipt image storage unit 27 (step S159). Here, N may be a minimum integer in integers which are equal to or larger than a quotient obtained by dividing the number of pages of edited and selected thumbnail images by the first threshold. Subsequently, the image synthesis unit 28 divides the edited and selected thumbnail images into N groups (step S160). Specifically, the thumbnail images corresponding to the number of the first threshold are sequentially extracted from a top of the edited and selected thumbnail images, and are sequentially allocated to the N groups from the top. At this time, there is a case where the number of thumbnail images allocated to an N-th group is less than the first threshold. Subsequently, the image synthesis unit 28 generates N synthesis images by respectively synthesizing the N receipt images generated in Step S159 with the thumbnail images allocated to the relevant groups in the N groups acquired through the division in Step S160 (step S161).

Finally, the image processing control unit 21 controls the formation of the synthesis images generated in step S158 or step S161 by the image forming unit 17 (step S162).

Subsequently, the thumbnail image editing and selecting process in step S156 of FIG. 7 will be described in detail.

Figure 8:
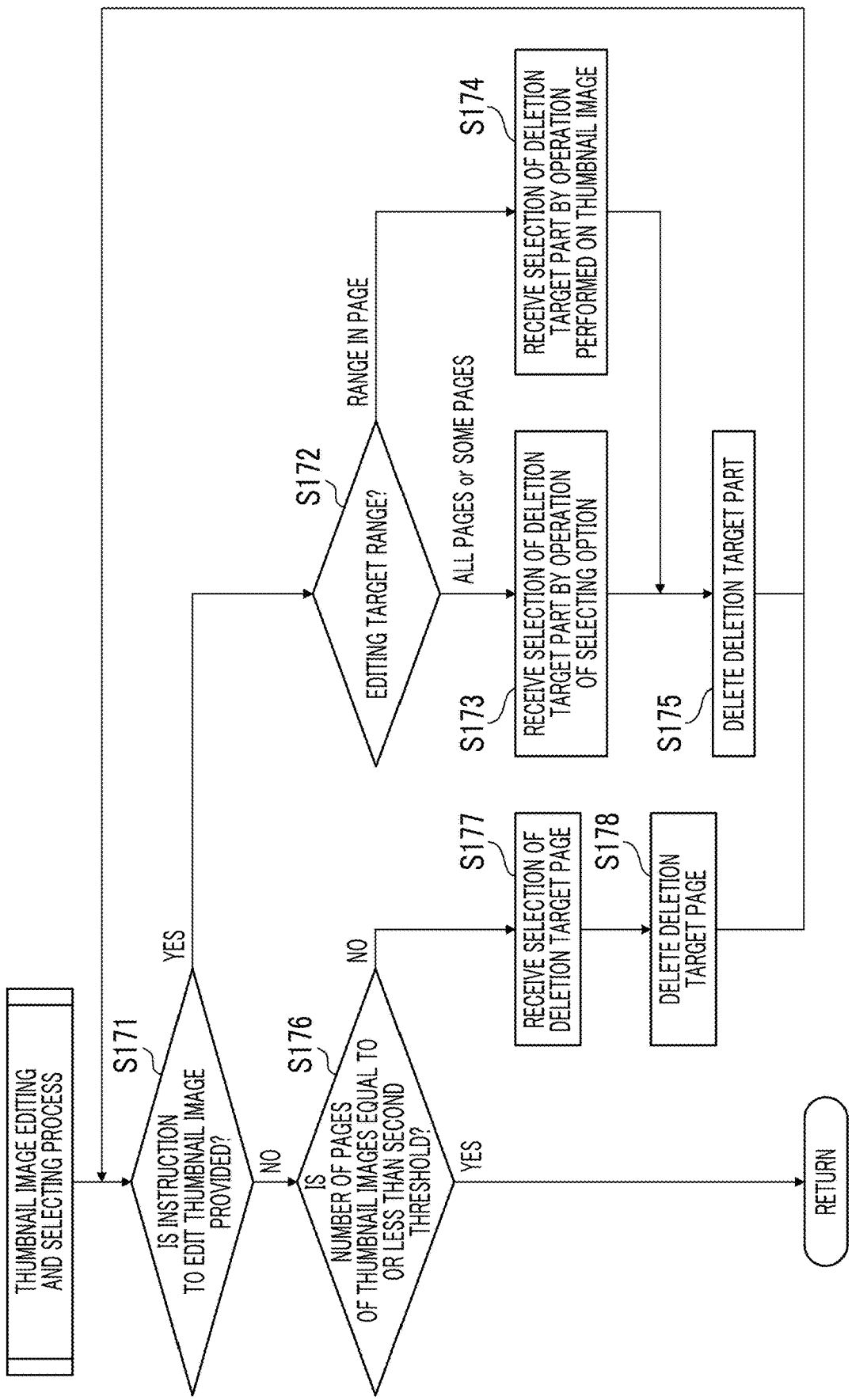
FIG. 8 is a flowchart illustrating a processing example of a thumbnail image editing and selecting process in the second operational example of the image processing apparatus according to the exemplary embodiment of the present invention.

FIG. 8 is a flowchart illustrating a processing example of the thumbnail image editing and selecting process in the second operational example of the image processing apparatus 10 according to the exemplary embodiment.

As illustrated in the drawing, the thumbnail image processing unit 25 first determines whether or not the instruction to edit the thumbnail image is provided (step S171). Specifically, the UI control unit 26 receives the user operation having a gist for editing the thumbnail image on the operation panel 15, and determines whether or not the thumbnail image processing unit 25 receives the gist from the UI control unit 26.

Here, the case where the thumbnail image processing unit 25 determines that the instruction to edit the thumbnail image is provided will be described.

In this case, the thumbnail image processing unit 25 performs the same process as in steps S122 to S125 in FIG. 4 (steps S172 to S175).

In addition, the case where the thumbnail image processing unit 25 does not determine that the instruction to edit the thumbnail image is provided will be described.

In this case, the thumbnail image processing unit 25 first determines whether the number of pages of the thumbnail images is equal to or less than the second threshold (step S176). For example, a fact that the thumbnail images corresponding to 100 pages are synthesized with the receipt image in a case where the first threshold is 4 is not realistic because 25 receipts are output, and thus an upper limit of the number of pages of the thumbnail images is provided.

As a result, in a case where it is not determined that the number of pages of the thumbnail images is equal to or less than the second threshold, the thumbnail image processing unit 25 receives the selection of the deletion target page (step S177). Specifically, the UI control unit 26 receives the user operation of selecting the deletion target page or the printing target page on the thumbnail image displayed on the operation panel 15. Further, in the case where the thumbnail image processing unit 25 receives information on the deletion target page or the printing target page. In a case where the information on the deletion target page is received, the thumbnail image processing unit 25 sets the page as the deletion target page, and, in the case where the information on the printing target page is received, the thumbnail image processing unit 25 sets a page other than the printing target page as the deletion target page. Otherwise, the UI control unit 26 receives the user operation of designating the method for selecting the deletion target page on the operation panel 15, and the thumbnail image processing unit 25 searches the pages of the thumbnail images for the page using the designated method, and sets the found page as the deletion target page. Here, the method for selecting the deletion target page includes the method for selecting the predetermined page, the method for selecting the randomly determined page, and the method for selecting the characteristic page.

Subsequently, the thumbnail image processing unit 25 deletes the deletion target page whose selection is received in step S127 (step S178).

Thereafter, the thumbnail image processing unit 25 returns the process to step S171.

On the other hand, in a case where it is determined that the number of pages of the thumbnail images is equal to or less than the second threshold, the thumbnail image processing unit 25 returns the process to the flowchart of FIG. 7.

Program

The process performed by the image processing apparatus 10 according to the exemplary embodiment is prepared, for example, as a program such as application software.

That is, the program for realizing the exemplary embodiment is recognized as a program causing a computer to realize a function of acquiring a processed image obtained by image processing, and a function of generating a synthesis image obtained by synthesizing an evidence image, which is an image becoming an evidence of the image processing and including at least information on a fee required for the image processing, with a reduction image obtained by reducing the processed image.

Also, it is possible to provide the program for realizing the exemplary embodiment not only by a communication section but also by being stored in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory, storing a program;
a processor, executing the program stored in the memory to be configured to:
acquire a processed image obtained through image processing;
generate a synthesis image obtained by synthesizing an evidence image, which is an image becoming an evidence of the image processing and including at least information on a fee required for the image processing, with a reduction image obtained by reducing the processed image; and
in a case where an amount of the reduction image exceeds a first image amount which is an amount of image that is synthesizable with the evidence image, perform a process of reducing the amount of the reduction image to be equal to or less than the first image amount.

2. The information processing apparatus according to claim 1, wherein the processor executes the program to be further configured to:
perform the process of reducing the amount of the reduction image to be equal to or less than the first image amount by selecting a part of a predetermined location from the reduction image.

3. The information processing apparatus according to claim 1, wherein the processor executes the program to be further configured to:
perform the process of reducing the amount of the reduction image to be equal to or less than the first image amount by selecting a part of a randomly determined location from the reduction image.

4. The information processing apparatus according to claim 1, wherein the processor executes the program to be further configured to:
perform the process of reducing the amount of the reduction image to be equal to or less than the first image amount by selecting a part that satisfies a previously fixed condition regarding an image feature from the reduction image.

5. The information processing apparatus according to claim 4,
wherein the previously fixed condition is a condition in which the image contains an element other than text.

6. The information processing apparatus according to claim 4, wherein the previously fixed condition is a condition in which the image contains an element other than text at a ratio which is equal to or more than a previously fixed ratio.

7. The information processing apparatus according to claim 1, wherein the processor executes the program to be further configured to:

perform the process of reducing the amount of the reduction image to be equal to or less than the first image amount by increasing a reduction ratio in a case of a document whose font size is a first size than a case of a document whose font size is a second size that is smaller than the first size to generate the reduction image.

8. The information processing apparatus according to claim 1, wherein the processor executes the program to be further configured to:

perform the process of reducing the amount of the reduction image to be equal to or less than the first image amount by increasing a reduction ratio in a case of a document which does not include text in the image than a case of a document which includes the text in the image to generate the reduction image.

9. An information processing apparatus comprising:
a memory, storing a program;
a processor, executing the program stored in the memory to be configured to:
acquire a processed image obtained through image processing;
generate a synthesis image obtained by synthesizing an evidence image, which is an image becoming an evidence of the image processing and including at least information on a fee required for the image processing, with a reduction image obtained by reducing the processed image; and
generate a plurality of synthesis images each of which is an image obtained by synthesizing the evidence image with a part of a first image amount of the reduction image in a case where the amount of the reduction image exceeds the first image amount, the first image amount being an amount of an image that is synthesizable with the evidence image.

10. The information processing apparatus according to claim 9, wherein the processor executes the program to be further configured to:

generate the plurality of synthesis images in a case where the amount of the reduction image is equal to or less than a second image amount being an amount of an image that is synthesizable with the evidence image in the plurality of synthesis images.

11. An information processing apparatus comprising:
a memory, storing a program;
a processor, executing the program stored in the memory to be configured to:
acquire a processed image obtained through image processing; and
generate a synthesis image obtained by synthesizing an evidence image, which is an image becoming an evidence of the image processing and including at least information on a fee required for the image processing, with a reduction image obtained by reducing the processed image,
wherein the evidence image further includes a processing condition of the image processing, and
the processor executes the program to be further configured to generate the synthesis image obtained by synthesizing the evidence image, which further includes the processing condition indicating that the image processing is processing of outputting an image in color, with an image obtained by performing conversion on the reduction image in black and white.

12. A non-transitory computer readable medium storing a program causing a computer to realize
a function of acquiring a processed image obtained by image processing;
a function of generating a synthesis image obtained by synthesizing an evidence image, which is an image becoming an evidence of the image processing and including at least information on a fee required for the image processing, with a reduction image obtained by reducing the processed image; and
a function of, in a case where an amount of the reduction image exceeds a first image amount which is an amount of image that is synthesizable with the evidence image, performing a process of reducing the amount of the reduction image to be equal to or less than the first image amount.

13. An information processing method comprising:
acquiring a processed image obtained through image processing;
generating a synthesis image obtained by synthesizing an evidence image, which is an image becoming an evidence of the image processing and including at least information on a fee required for the image processing, with a reduction image obtained by reducing the processed image; and
in a case where an amount of the reduction image exceeds a first image amount which is an amount of image that is synthesizable with the evidence image, performing a process of reducing the amount of the reduction image to be equal to or less than the first image amount.

* * * * *